UNITED STATES PATENT OFFICE.

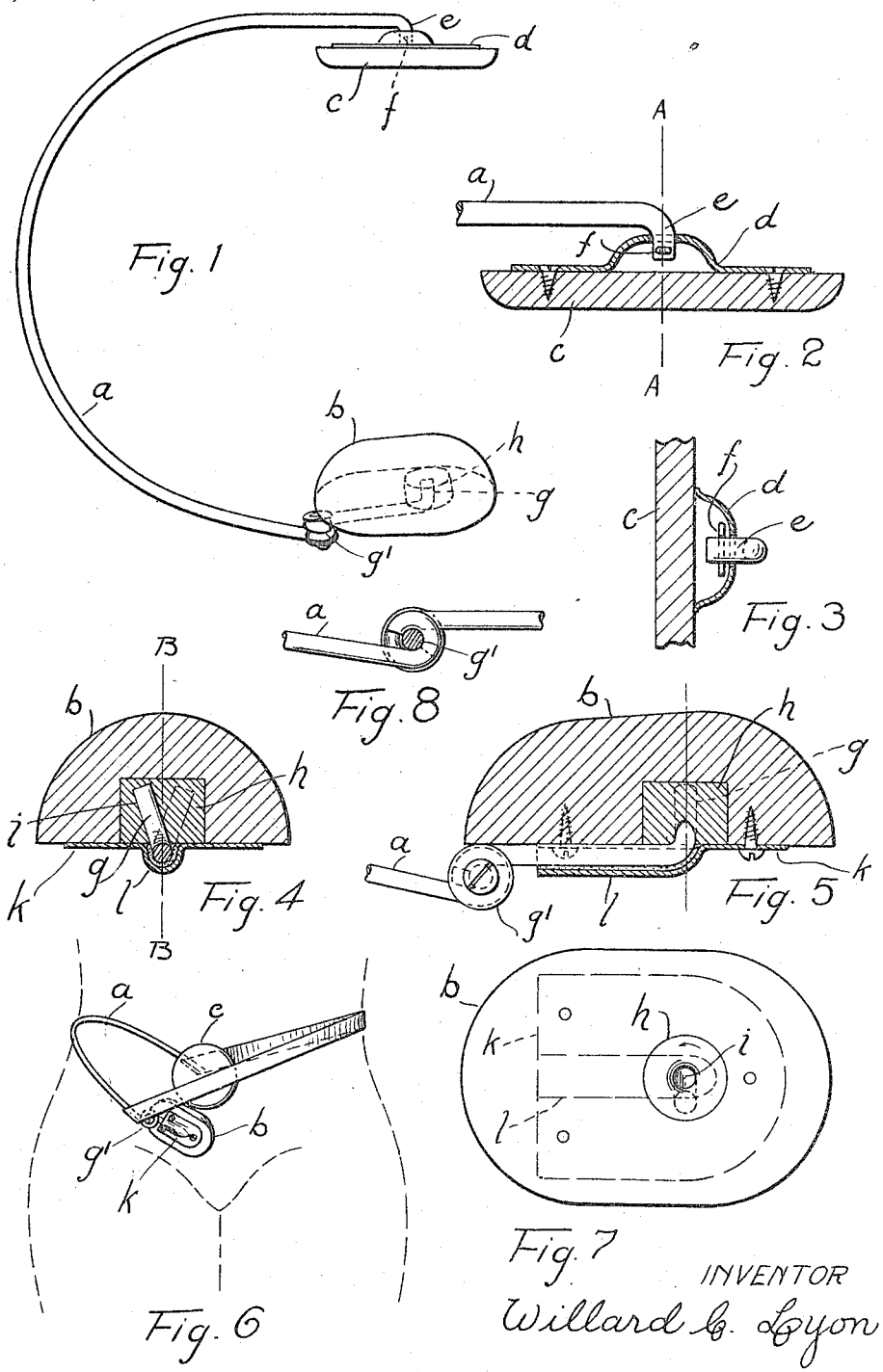

WILLARD C. LYON, OF DETROIT, MICHIGAN.

TRUSS.

1,202,399.  Specification of Letters Patent.  Patented Oct. 24, 1916.

Application filed September 29, 1915. Serial No. 53,185.

*To all whom it may concern:*

Be it known that I, WILLARD C. LYON, a citizen of the United States, residing at Detroit, county of Wayne, State of Michigan, have invented a certain new and useful Improvement in Trusses, and declare the following to be a full, clear, and exact description of the same, such as will enable others skilled in the art to which it pertains to make and use the same, reference being had to the accompanying drawings, which form a part of this specification.

This invention relates to trusses for hernia and other similar purposes.

It comprises a pair of pads or blocks joined by a spring yoke or half-ring. The novel features reside in the way the pads are fastened to the spring yoke, as will more fully appear in the description following.

In the drawings, Figure 1 shows the complete truss. Fig. 2 is a longitudinal section of the back pad. Fig. 3 is a cross section on the line A—A of Fig. 2. Fig. 4 is a cross section of the front pad. Fig. 5 is a section taken on the line B—B of Fig. 4. Fig. 6 is a view showing how the truss is applied to the body. Fig. 7 is a rear view of the front pad with the retaining plate removed. Fig. 8 shows the adjustable joint in the spring connection.

The truss comprises a spring yoke $a$ on the ends of which are mounted the two pads or blocks $b$ and $c$, the front block being the block $b$ and the rear block being the block $c$. It has been customary to make the joint between the rear end of the yoke and the rear pad by means of a ball and socket, but I have found this results in considerable chafing, and I have overcome this difficulty by making my joint in the following manner: A plate $d$ provided with a central boss is screwed to the rear of the pad $c$. Into this boss fits the curved or half-hooked end $e$ of the yoke. A pin $f$ is driven transversely of the end of the yoke which protrudes through into the boss. This keeps the hook and the boss from separating. It will be noted that by this construction a universal movement of the ball and socket joint is obtained, as the pad can pivot sidewise or around the hook and at the same time, by reason of the curvature of the hook, the pad can pivot backward and forward. A material improvement of this construction over the ordinary ball and socket joint is that there is a certain amount of looseness between the hook, the pin and the boss, which allows a free and easy action that avoids chafing and injury to the back. The front pad or block is also secured by means of a hook $g$ on the front end of the yoke. However, the pad is adjustable in two angular positions when considered as turning upon its own axis. This adjustment is secured by reason of employing a metal socket $h$ that fits into a recess in the block or pad and is provided with an obliquely directed socket $i$. By turning the plug one half a revolution the socket will be located on the opposite side of the center line B—B of Fig. 4 and occupy the position shown in the dotted lines. This gives two positions of adjustment angularly of the axis of the block in mounting the block in the yoke end. By making a pivotal joint at $g'$ further freedom of adjustment is secured. A retaining plate $k$ provided with a raised hollow rib $l$ to receive and hold a portion of the run of the yoke, is screwed to the pad $b$.

What I claim is:

1. In a truss, the combination of a block, a plate secured to the back so as to provide a chamber between the plate and block, an arm for supporting the block having at its end a short bent-over portion circular in cross section which passes through said plate, and a pin driven through the bent-over portion at the extreme end and engaging freely in said chamber, the depth of the chamber, length of the bent-over portion and position and thickness of the pin being calculated to allow rotation of the block on the bent-over portion, back and forward movement on the bent-over portion and tilting on the elbow, substantially as described.

2. In a truss, the combination of a block provided with a recess, a rotatable socket member or plug fitted into said recess and having an obliquely directed socket, a yoke provided with a hooked end which may engage with the socket member at half points in a complete turn to secure angular adjustment of the block, and means for retaining the said hooked end of the yoke in said socket member.

3. In a truss, the combination of a yoke, a block provided with a recess, a socket member adapted to fit into said recess and having an obliquely directed socket, the said hooked end of the yoke adapted to fit into the socket at half points in a complete turn of the socket member to secure angular adjustment of the block, and a plate provided with a raised hollow rib to accommodate a portion of the run of the yoke, said plate being adapted to be secured to the back of the block to hold the hooked end of the yoke in the said socket member.

4. In a truss, the combination of a block provided with a socket portion in which there is a socket arrangement to provide selective angular recess positions, and a yoke provided with a hooked end which may be optionally inserted in any positioned recess to secure an angular and positive adjustment of the block.

In testimony whereof I sign this specification.

WILLARD C. LYON.

Copies of this patent may be obtained for five cents each, by addressing the "Commissioner of Patents, Washington, D. C."